US012679352B2

(12) United States Patent
Brown et al.

(10) Patent No.: US 12,679,352 B2
(45) Date of Patent: Jul. 14, 2026

(54) APPARATUSES, SYSTEMS, AND METHODS FOR VEHICLE TRAJECTORY AND COLLISION PREDICTION

(71) Applicant: Toyota Jidosha Kabushiki Kaisha, Aichi-ken (JP)

(72) Inventors: Matthew J. Brown, Palo Alto, CA (US); Zhaoyuan Huo, Cupertino, CA (US); Julia Pralle, Palo Alto, CA (US)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 184 days.

(21) Appl. No.: 18/428,386

(22) Filed: Jan. 31, 2024

(65) Prior Publication Data

US 2025/0242803 A1 Jul. 31, 2025

(51) Int. Cl.
| | |
|---|---|
| *B60W 30/09* | (2012.01) |
| *B60W 30/095* | (2012.01) |
| *B60W 50/00* | (2006.01) |
| *B60W 50/14* | (2020.01) |
| *G06N 5/01* | (2023.01) |

(52) U.S. Cl.
CPC ...... *B60W 30/095* (2013.01); *B60W 50/0097* (2013.01); *G06N 5/01* (2023.01); *B60W 2520/06* (2013.01)

(58) Field of Classification Search
CPC .......... B60W 30/095; B60W 50/0097; B60W 2520/06; G06N 5/01
USPC ........................................................ 701/27
See application file for complete search history.

(56) References Cited

U.S. PATENT DOCUMENTS

| | | | |
|---|---|---|---|
| 9,718,468 B2 | 8/2017 | Barfield et al. | |
| 10,254,759 B1 * | 4/2019 | Faust | G06N 3/006 |
| 10,997,800 B1 | 5/2021 | Salodkar et al. | |
| 11,375,338 B2 | 6/2022 | Pal et al. | |
| 11,603,095 B2 | 3/2023 | Schleede et al. | |
| 12,337,870 B1 * | 6/2025 | Mukundan | B60W 60/0011 |
| 2022/0169282 A1 | 6/2022 | Gan | |
| 2022/0274625 A1 * | 9/2022 | Garimella | G06N 3/044 |
| 2023/0377462 A1 | 11/2023 | Ellis et al. | |
| 2024/0400095 A1 * | 12/2024 | Lee | B60W 60/0011 |
| 2025/0145179 A1 * | 5/2025 | Knittel | B60W 30/0956 |
| 2025/0162612 A1 * | 5/2025 | Woelki | B60W 60/00274 |

OTHER PUBLICATIONS

Vitelli et al., SafetyNet, 2021, Cornell (Year: 2021).*

* cited by examiner

Primary Examiner — Jelani A Smith
Assistant Examiner — George A Alcorn, III
(74) Attorney, Agent, or Firm — Dinsmore & Shohl LLP

(57) ABSTRACT

Disclosed apparatuses and methods for trajectory and collision prediction comprising a processor operable to generate, using a machine-learning (ML) model, a ML predicted trajectory of a vehicle and a ML model confidence of the ML predicted trajectory, generate, using a heuristics model, a heuristic predicted trajectory of the vehicle, determine whether the ML model confidence satisfies a metric, in response to determining that the ML model confidence satisfies the metric, apply the ML predicted trajectory as a predicted trajectory, and in response to determining that the ML learning model confidence fails the metric, apply the heuristic predicted trajectory as the predicted trajectory.

18 Claims, 3 Drawing Sheets

APPARATUSES, SYSTEMS, AND METHODS FOR VEHICLE TRAJECTORY AND COLLISION PREDICTION

TECHNICAL FIELD

The present disclosure relates to apparatuses, systems and methods for vehicle control, more specifically, to apparatuses, systems and methods for vehicle control by predicting vehicle trajectory and collision.

BACKGROUND

Vehicle transportation may pose heightened accident risks when relying solely on human drivers, who are susceptible to errors, face limited response times, and navigate unpredictable road conditions. Consequently, there is a demand for systems that can provide predictive vehicle control based on the prediction of vehicle trajectory and collisions. This is intended to mitigate accident risks, improve traffic flow with minimal congestion, and reduce travel times.

SUMMARY

In one embodiment, an apparatus for trajectory and collision prediction comprises a processor operable to generate, using a machine-learning (ML) model, a ML predicted trajectory of a vehicle and a ML model confidence of the ML predicted trajectory, generate, using a heuristics model, a heuristic predicted trajectory of the vehicle, determine whether the ML model confidence satisfies a metric, in response to determining that the ML model confidence satisfies the metric, apply the ML predicted trajectory as a predicted trajectory, and in response to determining that the ML learning model confidence fails the metric, apply the heuristic predicted trajectory as the predicted trajectory.

In another embodiment, a method for trajectory and collision prediction comprises generating, using a ML model, a ML predicted trajectory of a vehicle and a ML model confidence of the ML predicted trajectory, generating, using a heuristics model, a heuristic predicted trajectory of the vehicle, determining whether the ML model confidence satisfies a metric, in response to determining that the ML model confidence satisfies the metric, applying the ML predicted trajectory as a predicted trajectory, and in response to determining that the ML learning model confidence fails the metric, applying the heuristic predicted trajectory as the predicted trajectory.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
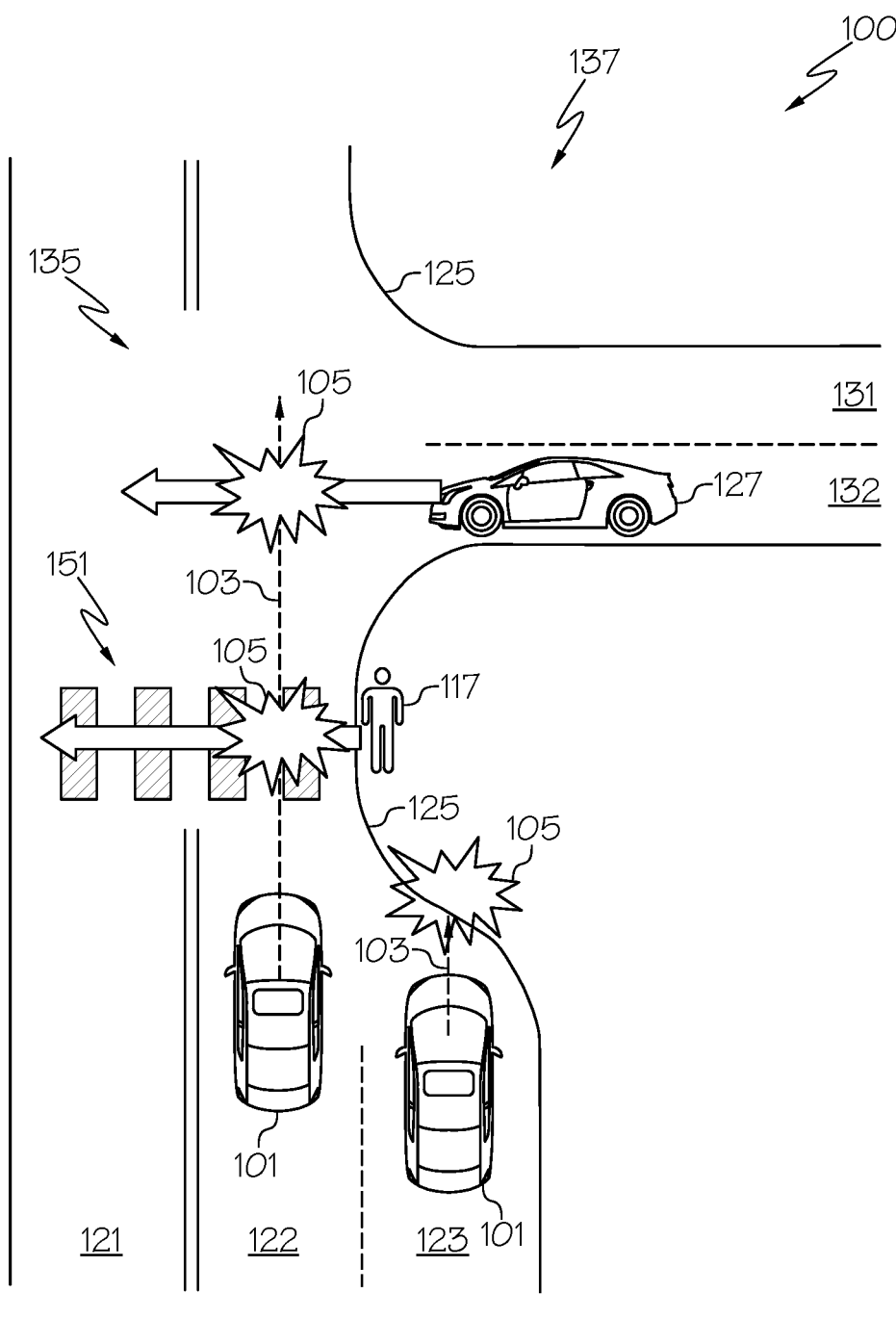
FIG. 1 schematically depicts an example system for trajectory and collision prediction of the present disclosure, in accordance with one or more embodiments shown and described herewith.

The disclosed embodiments include, apparatuses, systems and methods for trajectory and collision prediction using two different type of models, machine learning (ML) based models and heuristic based models. Embodiments may predict a trajectory of an autonomous vehicle using the ML models and another trajectory of the autonomous vehicle using the heuristic models. Embodiments described herein may decide which predicted trajectory to be used based on whether a ML model confidence of the ML model satisfies a metric.

By integrating ML based models and heuristic-based models for trajectory and collision prediction in autonomous vehicles, the disclosed apparatus, systems, and methods presents a synergistic approach that harnesses the strengths of both methodologies. ML models offer adaptability to diverse and evolving scenarios, capturing complex patterns and improving accuracy through data-driven learning. Heuristic models, on the other hand, provide transparency and rule-based predictability, ensuring a clear decision-making process. By combining these approaches, the system gains robustness and adaptability, with the added advantage of an ML model confidence metric for dynamic decision-making.

The metrics may include a model confidence threshold, a probability or certainty threshold, a prediction interval or confidence interval, a cross-validation performance, consistency over time, feature inputs, or a combination thereof. By incorporating these metrics, autonomous vehicles can prioritize trajectories with higher confidence, enhancing reliability in real-world scenarios. This approach enables the system to effectively balance the strengths of both ML-based models, which excel in learning complex patterns, and heuristic-based models, known for transparent rule-based predictions. The combination of these models, guided by confidence metrics, contributes to a flexible and adaptive trajectory prediction system that can make informed decisions in a diverse range of driving conditions. This integration improves the operations of the autonomous vehicle by offering reliable predictions, especially in undesirable scenarios, and reduces overreliance on ML in situations with limited or biased data. The real-time adaptability and interpretability of the system contribute to a comprehensive and reliable trajectory prediction framework for autonomous vehicles.

The disclosed apparatuses, systems, and methods provides trajectory predictions and collision predictions with high confidence, derived from ML models or heuristic models. In some situations, the heuristic predictions can act as a fallback in situations where ML models may lack sufficient training data or face challenges. The dynamic decision-making based on confidence metrics contributes to enhanced reliability in autonomous vehicle systems, providing a flexible and adaptive solution to address the complexities of real-world driving scenarios.

Various embodiments of the methods and systems for generating trajectory and collision prediction are described in more detail herein. Whenever possible, the same reference numerals will be used throughout the drawings to refer to the same or like parts. As used herein, the singular forms "a," "an" and "the" include plural referents unless the context clearly dictates otherwise. Thus, for example, reference to "a" component includes aspects having two or more such components unless the context clearly indicates otherwise.

Figure 2:
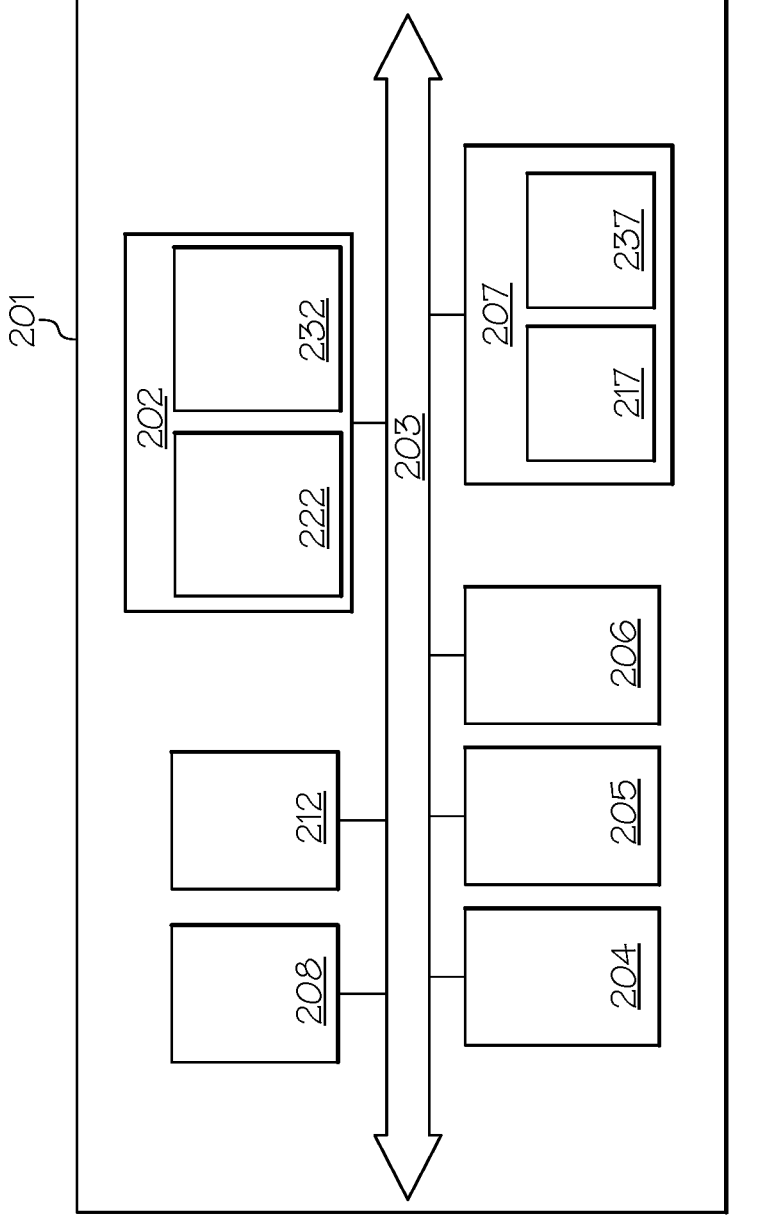
FIG. 2 schematically depicts example components of the apparatus and system for trajectory and collision prediction of the present disclosure, according to one or more embodiments shown and described herein.

Referring to the figures, FIGS. 1 and 2 schematically depicts an example trajectory and collision prediction system 100. The trajectory and collision prediction system 100 may include one or more controllers 201, which may further include one or more modules, such as a ML module 222 and a heuristic module 232. The ML module 222 may include one or more artificial intelligent algorithms, such as neural networks. The ML module 222 may generate a ML predict trajectory 103. The heuristic module 232 may include one or more heuristic models. The heuristic models may be predefined based on physical models (such as Newton's Laws of Motion, friction and traction, suspension and shock absorption), and near-optimal parameters associated with the physical models, where requirements of training is, if not none, is de minimis. In some embodiments, the heuristic models are based on expert knowledge and common sense, where no historical data is involved. The controller 201 may generate, using the heuristic module 232, a heuristic predicted trajectory 103 of the vehicle 101. The ML predicted trajectory 103 and the heuristic predicted trajectory 103 may be the same predicted trajectory 103 or different predicted trajectories 103.

The system may include one or more vehicles 101, which may be autonomous vehicles. In some embodiments, the one or more controllers 201 are included in the vehicles 101. In some embodiments, some of the vehicles 101 may include communication devices, such as vehicle network interface hardware, operable to wirelessly communicate with the controllers 201. In some embodiments, the controller 201 may be included in one or more servers including server communication devices operable to communicate with the vehicles 101.

Each of the vehicles 101 may be an automobile or any other passenger or non-passenger vehicle such as, for example, a terrestrial, aquatic, and/or airborne vehicle. Each of the vehicles 101 may be an autonomous vehicle that navigates its environment with limited human input or without human input. Each of the vehicles 101 may drive on a road and perform vision-based lane centering, e.g., using one or more sensors. Each of the vehicles 101 may include actuators for driving the vehicle, such as a motor, an engine, or any other powertrain. The vehicles 101 may move on various surfaces, such as, without limitations, roads, highways, streets, expressway, bridges, tunnels, parking lots, garages, off-road trails, railroads, or any surfaces where the vehicles may operate.

Figures 3, 4:
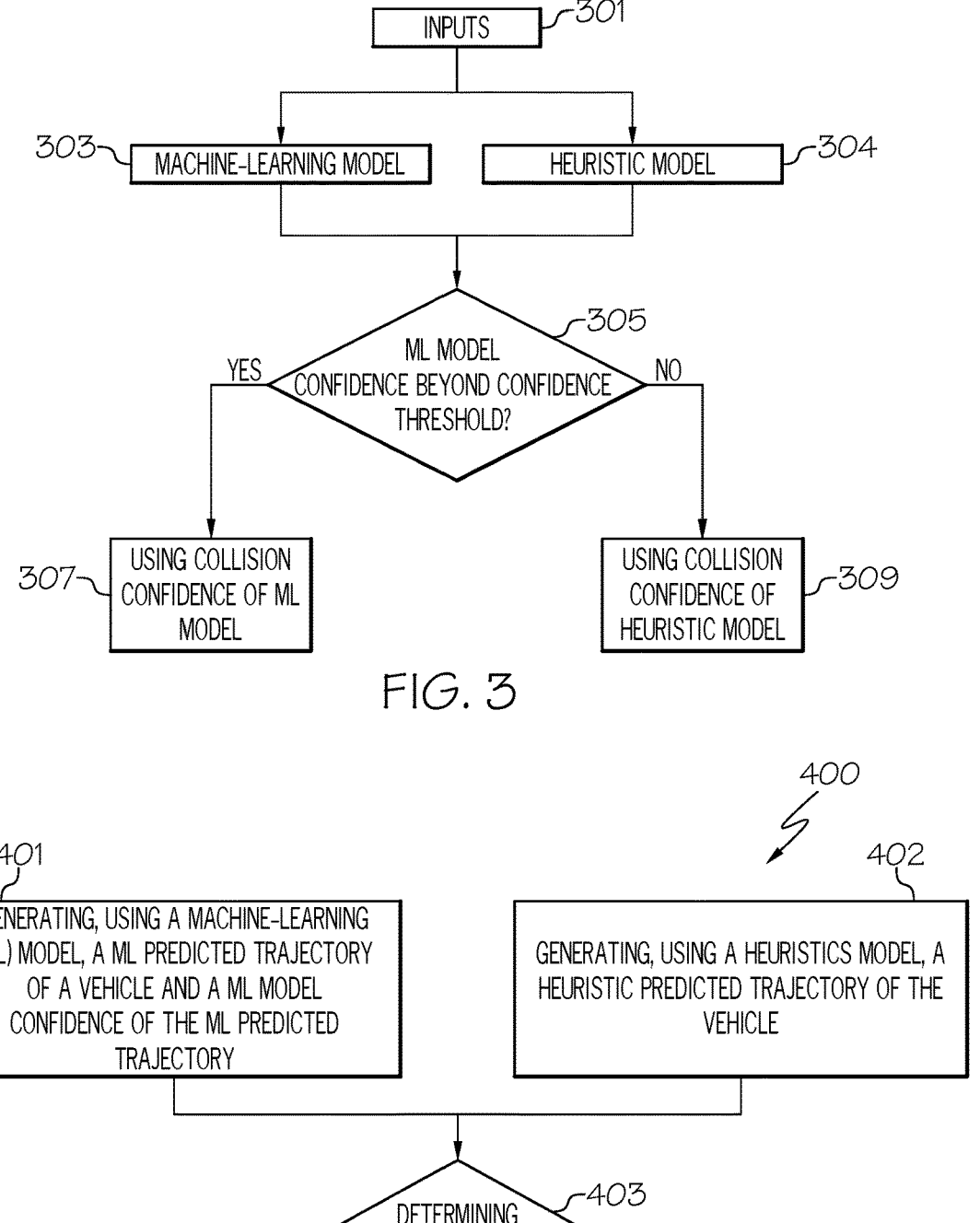
FIG. 3 depicts an illustrative block diagram of generating trajectory and collision prediction of the present disclosure, according to one or more embodiments shown and described herein.
FIG. 4 depicts a flowchart of illustrative steps for generating trajectory and collision prediction of the present disclosure, according to one or more embodiments shown and described herein.

In embodiments, the vehicles 101 may move on a surface and share the surface with one or more neighboring vehicles 127. For example, as illustrated in FIG. 3, the vehicles 101 and neighboring vehicles 127 may move on a road 137. The road 137 may include a vertical road and a horizontal road. The vertical road may include three lanes, namely a lane 121 in one direction, and lane 122 and 123 in the opposite direction, in some sections, and two lanes, namely the lane 121 and the lane 122, in the other sections. The horizontal road may include two-way lanes, a lane 131, and a lane 132. The vertical road and the horizontal road may cross at an intersection 135. The lane 123 may end before the intersection 135 and the curb 125 on the right side of the vertical road extends to narrow the vertical road. The curbs of the vertical road and the horizontal road may meet at the intersection 135 as the curbs 125. The road 137 may further includes a crosswalk 151 near the that around the intersection 135 cross the vertical road at the curb 125. One or more pedestrians 117 may move on or near the road 137 such as the crosswalk 151.

Referring to FIG. 2, example components of controller 201 are schematically depicted. Although FIG. 2 illustrates one controller 201, in some embodiments, the trajectory and collision prediction system 100 may include two or more controllers 201. The controller 201 or the vehicles 101 may include one or more vision sensors 208 and vehicle sensors 212. The vision sensors 208 may be used for capturing the images or videos of the environment around the vehicles 101. In some embodiments, the one or more vision sensors 208 include one or more imaging sensors configured to operate in the visual and/or infrared spectrum to sense visual and/or infrared light. Additionally, while the particular embodiments described herein are described with respect to hardware for sensing light in the visual and/or infrared spectrum, it is to be understood that other types of sensors are contemplated. For example, the systems described herein could include one or more LIDAR sensors, radar sensors, sonar sensors, or other types of sensors for gathering data that could be integrated into or supplement the data collection described herein. Ranging sensors like radar may be used to obtain a rough depth and speed information for the view of the vehicle 101. The one or more vision sensors 208 may include a forward facing camera installed in the vehicles 101. The one or more vision sensors 208 may be any device having an array of sensing devices capable of detecting radiation in an ultraviolet wavelength band, a visible light wavelength band, or an infrared wavelength band. The one or more vision sensors 208 may have any resolution. In some embodiments, one or more optical components, such as a mirror, fish-eye lens, or any other type of lens may be optically coupled to the one or more vision sensors 208. In embodiments described herein, the one or more vision sensors 208 may provide image data to the one or more processors 204 or another component communicatively coupled to the communication path 203. In some embodiments, the one or more vision sensors 208 may also provide navigation support. That is, data captured by the one or more vision sensors 208 may be used to autonomously or semi-autonomously navigate a vehicle.

The controller 201 or the vehicles 101 may include one or more vehicle sensors 212. Each of the one or more vehicle sensors 212 is coupled to the communication path 203 and communicatively coupled to the one or more processors 204. The one or more vehicle sensors 212 may include one or more speed sensors or motion sensors for detecting and measuring motion and changes in motion of a vehicle, e.g., the vehicle 101. The motion sensors may include inertial measurement units. Each of the one or more motion sensors may include one or more accelerometers and one or more gyroscopes. Each of the one or more motion sensors transforms sensed physical movement of the vehicle into a signal indicative of an orientation, a rotation, a velocity, or an acceleration of the vehicle. The acquired data from the vehicle sensors 212 may be used to determine the vehicle kinematics of the vehicles 101.

The vision sensors 208 and the vehicle sensors 212 may be used to collect and generate vehicle control data, road condition data, and vehicle kinematic data. The vehicle control data may include throttle position, brake status, steering angle, and gear selection. The road condition data may include road type, friction coefficient, and surface irregularities (e.g., bumps). The vehicle kinematic data may include velocity, acceleration, position, and orientation.

The controller 201 may include one or more processors 204. Each of the one or more processors 204 may be any device capable of executing machine-readable and executable instructions. The instructions may be in the form of a machine-readable instruction set stored in data storage component 207 and/or a memory component 202. Accordingly, each of the one or more processors 204 may be a controller, an integrated circuit, a microchip, a computer, or any other computing device. The one or more processors 204 are coupled to a communication path 203 that provides signal interconnectivity between various modules of the system. Accordingly, the communication path 203 may communicatively couple any number of processors 204 with one another, and allow the modules coupled to the communication path 203 to operate in a distributed computing environment. Specifically, each of the modules may operate as a node that may send and/or receive data. As used herein, the term "communicatively coupled" means that coupled components are capable of exchanging data signals with one another such as for example, electrical signals via a conductive medium, electromagnetic signals via air, optical signals via optical waveguides, and the like.

Accordingly, the communication path 203 may be formed from any medium that is capable of transmitting a signal such as for example, conductive wires, conductive traces, optical waveguides, or the like. In some embodiments, the communication path 203 may facilitate the transmission of wireless signals, such as WiFi, Bluetooth®, Near Field Communication (NFC), and the like. Moreover, the communication path 203 may be formed from a combination of mediums capable of transmitting signals. In one embodiment, the communication path 203 comprises a combination of conductive traces, conductive wires, connectors, and buses that cooperate to permit the transmission of electrical data signals to components such as processors, memories, sensors, input devices, output devices, and communication devices. Accordingly, the communication path 203 may comprise a vehicle bus, such as for example a LIN bus, a CAN bus, a VAN bus, and the like. Additionally, it is noted that the term "signal" means a waveform (e.g., electrical, optical, magnetic, mechanical, or electromagnetic), such as DC, AC, sinusoidal wave, triangular wave, square wave, vibration, and the like, capable of traveling through a medium.

The controller 201 may include one or more memory components 202 coupled to the communication path 203. The one or more memory components 202 may comprise RAM, ROM, flash memories, hard drives, or any device capable of storing machine-readable and executable instructions such that the machine-readable and executable instructions can be accessed by the one or more processors 204. The machine-readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine-readable and executable instructions and stored on the one or more memory components 202. Alternatively, the machine-readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The one or more memory components 202 may include one or more modules, including the ML module 222 and the heuristic module 232. Each of the one or more modules may include, but is not limited to, routines, subroutines, programs, objects, components, data structures, and the like for performing specific tasks or executing specific data types as will be described below. The data storage component 207 may store historical data 217, such as historical vehicle kinematic data, historical vehicle control data, historical road condition data, historical trajectory data of the vehicle 101, historical collision data, and other historical data related to operation of the vehicle 101. The data storage component 207 may further store training data 237 for training the ML module 222 or heuristic module 232. The ML module 222 and the heuristic module 232 may also be stored in the data storage component 207 during operating or after operation.

The ML module 222 may include one or more machine learning algorithms or neural networks. The modules may be trained and provided machine learning capabilities via a neural network as described herein. By way of example, and not as a limitation, the neural network may utilize one or more artificial neural networks (ANNs). In ANNs, connections between nodes may form a directed acyclic graph (DAG). ANNs may include node inputs, one or more hidden activation layers, and node outputs, and may be utilized with activation functions in the one or more hidden activation layers such as a linear function, a step function, logistic (Sigmoid) function, a tan h function, a rectified linear unit (ReLu) function, or combinations thereof. ANNs are trained by applying such activation functions to training data sets to determine an optimized solution from adjustable weights and biases applied to nodes within the hidden activation layers to generate one or more outputs as the optimized solution with a minimized error. In machine learning applications, new inputs may be provided (such as the generated one or more outputs) to the ANN model as training data to continue to improve accuracy and minimize error of the ANN model. The one or more ANN models may utilize one to one, one to many, many to one, and/or many to many (e.g., sequence to sequence) sequence modeling. The one or more ANN models may employ a combination of artificial intelligence techniques, such as, but not limited to, Deep Learning, Random Forest Classifiers, Feature extraction from audio, images, clustering algorithms, or combinations thereof. In some embodiments, a convolutional neural network (CNN) may be utilized. For example, a convolutional neural network (CNN) may be used as an ANN that, in a field of machine learning, for example, is a class of deep, feed-forward ANNs applied for audio analysis of the recordings. CNNs may be shift or space invariant and utilize shared-weight architecture and translation. Further, each of the various modules may include a generative artificial intelligence algorithms. The generative artificial intelligence algorithm may include a general adversarial network (GAN) that has two networks, a generator model and a discriminator model. The generative artificial intelligence algorithm may also be based on variation autoencoder (VAE) or transformer-based models. It should be understood that embodiments are not limited to any particular ML model.

The controller 201 may include input/output hardware 205 coupled to the communication path 203. The input/output hardware 205 may include a monitor, keyboard, mouse, printer, camera, microphone, speaker, and/or other device for receiving, sending, and/or presenting data.

The controller 201 may include network interface hardware 206 for communicatively coupling the controller 201 to external resources (e.g., the vehicles 101 or smart devices), Internet of Things (IoTs), and/or a server. The network interface hardware 206 can be communicatively coupled to the communication path 203 and can be any device capable of transmitting and/or receiving data via a network. Accordingly, the network interface hardware 206 can include a communication transceiver for sending and/or receiving any wired or wireless communication. For example, the network interface hardware 206 may include an antenna, a modem, LAN port, WiFi card, WiMAX card, mobile communications hardware, near-field communication hardware, satellite communication hardware, and/or any wired or wireless hardware for communicating with other networks and/or devices. In one embodiment, the network interface hardware 206 includes hardware configured to operate in accordance with the Bluetooth® wireless communication protocol. For example, the network interface hardware 206 of the trajectory and collision prediction system 100 may transmit predicted trajectory 103, predicted collision 105, ML model confidence, collision confidence with a server or the vehicles 101.

Referring back to FIG. 1, the controller 201 may generate predicted trajectory 103 for the vehicles 101, such as autonomous vehicles, and further predicted collision 105 to entities (such as the neighboring vehicle 127 and the pedestrian 117) and obstacles (such as the curb 125) on the road 137. The vehicles 101 may generate and transmit sensory data, such as the vehicle kinematic data, the vehicle control data, and the road condition data to the controller 201. In embodiments, the vehicle kinematic data may be a vehicle position, a vehicle velocity, and a vehicle acceleration of the vehicle 101. The vehicle control data may be vehicle steering, vehicle throttle, and brake inputs of the vehicle 101. The road condition data may include road surface conditions, road geometry, and traffic conditions of the road 137.

Upon receiving the sensory data and other input data, such as local weather conditions, the controller 201 may generate, using the ML module 222, the ML predicted trajectory 103 of the vehicle 101 and the ML model confidence of the predicted trajectory 103. The ML model confidence may a number between 0 and 1, with 0 indicating the lowest confidence value and 1 indicating the highest confidence value. In embodiments, the ML module 222 may generate the model confidence based on a probabilistic model or a distance-based model. In some embodiments, the ML module 222 may include one or more probability-based models. the ML module 222 may include a Softmax activation function in the output layer to determine the probability of each output of the predicted trajectory and/or collision. The ML module 222 may include an uncertainty estimation function, such as Bayesian Neural Networks, to provide uncertainty estimates of the predicted trajectory and collision. In some embodiments, the ML module 222 may include one or more distance-based models. For example, the ML module 222 may include a distance-to-decision-boundary function. The confidence may be inferred by measuring the distance of any output as point features to the decision boundary of the sample data and the historical data. Output points far from the boundary are denoted with higher confidence, while output points near the boundary may have lower confidence. Similarly, the ML module 222 may include a Margin-based Confidence function. The margin between the decision boundary of the sample data and the historical data, and the output data points are used as a measure of confidence. Larger margins indicate higher confidence.

In embodiments, the ML module 222 may include one or more neural networks. The neural networks may include an encoder, one or more layers of hidden layers, and a decoder. The neural networks may feed training data 237 during the pre-training process into the encoder to generate a lower-dimensional representation of the target input-output pairs. For example, the lower-dimensional representation may include input of sensory data collected using the vision sensor 208 and vehicle sensors 212 pairing with predicted trajectories and collisions as well as detected trajectories and collisions of the vehicles 101 relative to the entities and objects on the road, such as obstacles (e.g. curbs 125), pedestrians 117, and the neighboring vehicles 127. The neural networks may output ML predicted trajectory 103 and predicted collisions 105.

In embodiments, the controller 201 further generates collision confidence associated with the predicted trajectory 103 using the ML module 222, the heuristic module 232, or both. In some embodiments, the controller 201 may determine whether the collision confidence is beyond a collision threshold. In some embodiments, the controller 201 may generate the collision confidence as a ML collision confidence based on the ML models in response to determining that the ML model confidence satisfies the metric. The metrics may include a model confidence threshold, a probability or certainty threshold, a prediction interval or confidence interval, a cross-validation performance, consistency over time, feature inputs, or a combination thereof. For example, the ML module 222 may include a ML model confidence threshold, a probability or certainty threshold, such as 50%, 55%, 60%, 65%, 70%, 75%, 80%, 85%, 90%, 100%, or any number between 0 and 1. The ML predicted trajectory 103 is used when the ML model confidence is more than the model confidence threshold or the probability or certainty threshold. The ML module 222 may further use prediction intervals or confidence intervals for a quantifiable range within which the actual trajectory is likely to fall. The ML module 222 may use the cross-validation performance metrics, such as accuracy or precision, to assess overall reliability, and monitor consistency over time to identify fluctuations in ML model confidence. The integration of ML model confidence metrics into the decision-making process for trajectory prediction introduces a dynamic mechanism where the system adapts based on the model's perceived reliability. In some embodiments, in response to determining that the ML model confidence satisfies the metric, the controller 201 may apply the ML predicted trajectory 103 as the predicted trajectory 103 for further determinations, such as collision determination. In some embodiments, in response to determining that the ML learning model confidence fails the metric, the controller 201 may apply the heuristic predicted trajectory 103 as the predicted trajectory 103 for further procedures.

In embodiments, the controller 201 may generate the collision confidence as a heuristic collision confidence based on the heuristic model in response to determining that the ML model confidence fails the metric. In some embodiments, the controller 201 may generate the collision confidence as a blending collision confidence generated by blending a ML collision confidence and a heuristic collision confidence using weights based on the ML model confidence. For example, the blending collision confidence may be calculated with the following equation:

$$\text{Blending collision confidence} = \text{ML model confidence} \times \text{ML collision confidence} + (1 - \text{ML model confidence}) \times \text{heuristic collision confidence}$$

In embodiments, after the controller 201 determines that the collision confidence is beyond a collision threshold, the controller 201 may inform the vehicle 101 of a predicted collision. In some embodiments, after the controller 201 determines that the collision confidence is beyond a collision threshold, the controller 201 may generate a trajectory planning to avoid the predicted collision. The controller 201 may instruct and/or operate the vehicle 101 to follow the trajectory planning.

For example, the ML module 222 may generate a predicted trajectory 103 with a ML model confidence of 0.6. the ML module 222 may further determine the collision confidence, based on the predicted trajectory 103, the current motion data of the vehicle 101, and the geometry of the road 137. The collision confidence may represent the possibility for the vehicle 101 to collide with an obstacle (e.g. curb 125) or an entity (a pedestrian 117 or a neighboring vehicle 127) on the road 137. For example, as illustrated in FIG. 1, the ML module 222 may determine that the vehicle 101 in lane 123 may collide with the curb 125 with a collision confidence 0.4. Similarly, the heuristic module 232 may determine that the vehicle 101 in lane 123 may collide with the curb 125 with the collision confidence 0.7. The controller 201 may determine that the collision confidence 0.4 generated by the ML module 222 is not beyond the collision threshold of 0.45, after determining that a ML model confidence of 0.6 satisfy the metric. The controller 201 may not inform the vehicle 101 of the predicted collision 105 at the curb 125. In another example, the controller 201 may use the blending approach to generate the blending collision confidence of 5.2 (i.e. 0.6×0.4+ (1−0.6)×0.7) using the weights based on the ML model confidence 0.6 and determine the blending collision confidence is beyond the collision threshold of 0.45. The controller 201 may then inform the vehicle 101 at lane 123 of a predicted collision 105 at the curb 125. The controller 201 may further generate a trajectory planning (e.g. brake the vehicle 101 to full stop) to avoid the predicted collision, and instruct and/or operate the vehicle 101 to follow the trajectory planning (e.g., decelerate the vehicle 101 to a full stop).

In another example, as illustrated in FIG. 1, the ML module 222 and heuristic module 232 may generate a predicted trajectory 103 of the vehicle 101 in lane 122 in moving in the lane 122 to the north. The vehicle 101 or the controller 201 may detect a pedestrian 117 at the right end of the crosswalk 151 and a neighboring vehicle 127 in the lane 132 is moving toward the intersection 135. Based on the ML models, the controller 201 may determine that the pedestrian 117 may walk onto the crosswalk 151 to move to the other side of the road 137 and the collision confidence of the predicted collision 105 with the pedestrian 117 may be beyond a collision threshold. Based on the heuristic models, the controller 201 may determine that the pedestrian 117 may be about to stay still based on the current motion of the pedestrian 117 with a collision confidence less than the collision threshold. In one case, the controller 201 may inform the vehicle 101 in the lane 122 that the predicted collision 105 with the pedestrian 117 based on the ML model confidence of the predicted trajectory 103 satisfying the metric. In another case, the controller 201 may balance the predicted collision based on ML models and the heuristic models by blending a ML collision confidence and a heuristic collision confidence using weights based on the ML model confidence. Similarly, the controller 201 may determine, based on the ML models, that the neighboring vehicle 127 may stop at the intersection 135 and may not collide the vehicle 101 in the lane 122 at the intersection 135 such that the collision confidence is below the collision threshold. The controller 201 may determine, based on the heuristic models, that the neighboring vehicle 127 may continue moving in the lane 132 based on the current motion data of the neighboring vehicle 127, and predict a collision 105 with the vehicle 101 in the lane 122 at the intersection that has a collision confidence greater than the collision threshold. The controller 201, after determining that the ML model confidence satisfies a metric, may determine a low possibility of the predicted collision 105 with the neighboring vehicle 127 at the intersection. Alternatively, the controller 201 may balance the predicted collision based on ML models and the heuristic models by blending a ML collision confidence and a heuristic collision confidence using weights based on the ML model confidence.

Referring back to FIG. 2, in some embodiments, the ML module may include one or more neural network having been trained with the training data 237 and the historical data 217. The neural networks may include an encoder or/and a decoder conjunct with a layer normalization operation or/and an activation function operation. The encoded input data may be normalized and weighted through the activation function before being fed to the hidden layers. The hidden layers may generate a representation of the input data at a bottleneck layer. After delivering neural-network processed data to the final layer of the neural network, a global layer normalization may be conducted to normalize the ML model confidence, collision confidence, predicted trajectories, and predicted collision. The outputs may be normalized and converted using an activation function for training and verification purposes, as described in detail further below. The activation function may be linear or nonlinear. The activation function may be, without limitations, a Sigmoid function, a Softmax function, a hyperbolic tangent function (Tan h), or a rectified linear unit (ReLU). The neural networks may feed the encoder with historical data 217, such as historical vehicle kinematic data, historical vehicle control data, historical road condition data, historical predicted trajectory, historical detected trajectory, historical predicted collision, historical detected collision, and other historical vehicle operation data for continuation training.

In embodiments, the one or more vehicle modules may be pre-trained using training data 237, including ground-truth examples and scenarios where multiple entities (e.g. the vehicles 101 and the neighboring vehicles 127) driving on a shared surface, such as road 137 including multiple lanes, intersection, curbs, and crosswalks. The pre-training may include labeling the entities and desirable trajectory and collisions based on the entities and the share surface in the examples and scenarios and using one or more neural networks to learn to predict the desirable and undesirable trajectory and collisions based on the training data 237. The pre-training may further include fine tuning, evaluation, and testing steps. The modules may be continuously trained using the real-world collected data as the historical data 217 to adapt to changing conditions and factors and improve the performance over time. The neural network may be trained based on the activation functions mentioned further above. The encoder may generate encoded input data $h=(Wx+b)$ that is transformed from the input data of one or more input channels. The encoded input data of one of the input channels may be represented as $h_{ij}=g(Wx_{ij}+b)$ from the raw input data $x_{ij}$, which is then used to reconstruct output $\tilde{x}_{ij}=f(W^Th_{ij}+b')$. The neural networks may reconstruct outputs, such as ML model confidence, collision confidence, predicted trajectories 103, and predicted collision 105, into $x'=(WTh+b')$, where W is weight, b is bias, WT and b' are transverse values of W and b and are learned through back propagation. In this operation, the neural networks may calculate, for each input data, a distance between an input data x and a reconstructed input data x', to yield a distance vector $|x-x'|$. The neural networks may minimize the loss function which is a utility function as the sum of all distance vectors. The training process may enable the neural network to learn linear or non-linear representations of the input data. The accuracy of the predicted output may be evaluated by satisfying a preset value, such as a preset accuracy and area under the curve (AUC) value computed using an output score from the activation function (e.g. the Softmax function or the Sigmoid function). For example, the trajectory and collision prediction system 100 may assign the preset value of the AUC with the value of 0.7 to 0.8 as an acceptable simulation, 0.8 to 0.9 is as an excellent simulation, or more than 0.9 as an outstanding simulation. After the training satisfying the preset value, the updated neural networks may be stored in the ML module 222, which are used to for future trajectory and collision prediction.

In contrast, the heuristic module 232 may not be trained or continuously trained. The heuristic module 232 may include pre-determined algorithms with known models, functions, equations, with parameters that may be optimized or tuned by inputs or training data 237. For example, the heuristic module 232 may include Newton's Laws of Motion, friction and traction, suspension and shock absorption, or other models, functions, and equations in determining the kinetics and motions of the vehicles 101. The pre-determined algorithms may include parameters of the vehicles 101 and the surface where the vehicles move, such as road 137, and other factors in determining the trajectory of the vehicle 101, such as mass and dimensions of the vehicles 101, velocities, accelerations, torques, brake friction of the vehicles 101, road type, road conditions, and other motion factors. The pre-determined algorithms may include one or more coefficients that may be determined based on training data 237 and may be further optimized based on the historical data 217. Accordingly, the heuristic module 232 may use the pre-determined algorithms with sensory data of the vehicle control data, the road condition data, and/or the vehicle kinematic data collected using sensors 208 and 212 the as input and output one or more predicted trajectories 103 with probability, and further to determine a collision confidence.

Referring to FIG. 3, an illustrative block diagram of determination of using collision confidence of ML models or heuristic models is depicted. At block 301, the trajectory and collision prediction system 100 may receive inputs, such as collect the vehicle control data (e.g., throttle position, brake status, steering angle, and gear selection of the autonomous vehicles), road condition data (e.g., road type, friction coefficient, and surface irregularities), and the vehicle kinematic data (velocity, acceleration, position, and orientation of the autonomous vehicles). At blocks 303 and 304, the trajectory and collision prediction system 100 may generate the collision confidence and the model confidence associated with the collision confidence using ML models (at block 303), and the collision confidence using heuristic models (at block 304). At block 305, the trajectory and collision prediction system 100 may determine whether the ML model confidence associated with collision confidence generated using ML models is beyond a confidence threshold. At block 307, in response to a yes to the block 305, the trajectory and collision prediction system 100 may use the collision confidence generated by the ML models for further operations. At block 309, in response to a no to the block 305, the trajectory and collision prediction system 100 may use the collision confidence generated by the heuristic models for further operations. The further operations may include informing the autonomous vehicle of the predicted collision and/or generating a trajectory planning to avoid the predicted collision and instruct the vehicle to follow the trajectory planning.

Referring to FIG. 4, flowcharts of method 400 for trajectory and collision prediction is depicted. At block 401, the present method 400 include generating, using the ML model, the ML predicted trajectory (such as the predicted trajectory 103 in FIG. 1) of the vehicle (such as the vehicle 101 in FIG. 1) and a ML model confidence of the ML predicted trajectory. At block 402, the present method 400 include generating, using a heuristics model, a heuristic predicted trajectory of the vehicle. At block 403, the present method 400 include determining whether the ML model confidence satisfies a metric. At block 404, in response to a yes to the block 403, the present method 400 include applying the ML predicted trajectory as a predicted trajectory. At block 405, in response to a no to the block 403, the present method 400 include applying the heuristic predicted trajectory as the predicted trajectory.

In embodiments, the present method 400 may further include generate collision confidence associated with the predicted trajectory using the ML model, the heuristic model, or a combination thereof. In some embodiments, the present method 400 may include determining whether the collision confidence is beyond a collision threshold, and in response to determining that the collision confidence is beyond the collision threshold, informing the vehicle of a predicted collision, or generating a trajectory planning to avoid the predicted collision and instruct the vehicle to follow the trajectory planning. In some embodiments, the collision confidence may be a ML collision confidence generated based on the ML model in response to determining that the ML model confidence satisfies the metric. The collision confidence may be a heuristic collision confidence generated based on the heuristic model in response to determining that the ML model confidence fails the metric. In some embodiments, the collision confidence may be a blending collision confidence generated by blending a ML collision confidence and a heuristic collision confidence using weights based on the ML model confidence. For example, the blending collision confidence may be calculated with the following equation:

Blending collision confidence=ML model confidence×ML collision confidence+(1−ML model confidence)×heuristic collision confidence In embodiments, the model confidence may be determined based on a probabilistic model or a distance-based model. The ML predicted trajectory and the heuristic predicted trajectory may be generated based on vehicle kinematics, vehicle controls, and road conditions. The vehicle kinematics may include a vehicle position, a vehicle velocity, and a vehicle acceleration. The vehicle controls may include vehicle steering, vehicle throttle, and brake inputs. The road conditions may include road surface conditions, road geometry, and traffic conditions. Information of the vehicle kinematics, the vehicle controls, and the road conditions are collected by one or more vision sensors and speed sensors.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An apparatus for trajectory and collision prediction comprising a processor operable to:
   generate, using a machine-learning (ML) model, a ML predicted trajectory of a vehicle and a ML model confidence of the ML predicted trajectory;
   generate, using a heuristics model, a heuristic predicted trajectory of the vehicle;
   determine whether the ML model confidence satisfies a metric;
   in response to determining that the ML model confidence satisfies the metric, apply the ML predicted trajectory as a predicted trajectory;
   in response to determining that the ML learning model confidence fails the metric, apply the heuristic predicted trajectory as the predicted trajectory;
   generate collision confidence associated with the predicted trajectory, wherein the collision confidence comprises a blending collision confidence generated by blending a ML collision confidence and a heuristic collision confidence using weights based on the ML model confidence;
   determine whether the collision confidence is beyond a collision threshold, and
   in response to determining that the collision confidence is beyond the collision threshold, generate a trajectory planning and operate the vehicle based on the trajectory planning.

2. The apparatus of claim 1, wherein the processor is operable to further:
   in response to determining that the collision confidence is beyond the collision threshold, inform the vehicle of a predicted collision.

3. The apparatus of claim 2, wherein the processor is operable to further instruct the vehicle to follow the trajectory planning.

4. The apparatus of claim 1, wherein the ML collision confidence is generated based on the ML model in response to determining that the ML model confidence satisfies the metric.

5. The apparatus of claim 1, wherein the heuristic collision confidence is generated based on the heuristic model in response to determining that the ML model confidence fails the metric.

6. The apparatus of claim 1, wherein the blending collision confidence is determined based on following equation:

$$\text{blending collision confidence} = \text{ML model confidence} \times \text{ML collision confidence} + (1 - \text{ML model confidence}) \times \text{heuristic collision confidence}.$$

7. The apparatus of claim 1, wherein the ML model confidence is determined based on a probabilistic model or a distance-based model.

8. The apparatus of claim 1, wherein the ML predicted trajectory and the heuristic predicted trajectory are generated based on vehicle kinematics, vehicle controls, and road conditions.

9. The apparatus of claim 8, wherein the vehicle kinematics comprise a vehicle position, a vehicle velocity, and a vehicle acceleration.

10. The apparatus of claim 8, wherein the vehicle controls comprise vehicle steering, vehicle throttle, and brake inputs.

11. The apparatus of claim 8, wherein the road conditions comprise road surface conditions, road geometry, and traffic conditions.

12. The apparatus of claim 8, wherein the apparatus further comprises one or more vision sensors and speed sensors configured to collect information of the vehicle kinematics, the vehicle controls, and the road conditions.

13. A method for trajectory and collision prediction comprising:
   generating, using a machine-learning (ML) model, a ML predicted trajectory of a vehicle and a ML model confidence of the ML predicted trajectory;
   generating, using a heuristics model, a heuristic predicted trajectory of the vehicle;
   determining whether the ML model confidence satisfies a metric;
   in response to determining that the ML model confidence satisfies the metric, applying the ML predicted trajectory as a predicted trajectory;
   in response to determining that the ML learning model confidence fails the metric, applying the heuristic predicted trajectory as the predicted trajectory;
   generating collision confidence associated with the predicted trajectory, wherein the collision confidence comprises a blending collision confidence generated by blending a ML collision confidence and a heuristic collision confidence using weights based on the ML model confidence;
   determining whether the collision confidence is beyond a collision threshold, and
   in response to determining that the collision confidence is beyond the collision threshold, generating a trajectory planning and operating the vehicle based on the trajectory planning.

14. The method of claim 13, wherein the method further comprises:
   in response to determining that the collision confidence is beyond the collision threshold, informing the vehicle of a predicted collision, and instruct the vehicle to follow the trajectory planning.

15. The method of claim 13, wherein:
   the ML collision confidence is generated based on the ML model in response to determining that the ML model confidence satisfies the metric; and
   the heuristic collision confidence is generated based on the heuristic model in response to determining that the ML model confidence fails the metric.

16. The method of claim 13, wherein the blending collision confidence is determined based on following equation:

$$\text{blending collision confidence} = \text{ML model confidence} \times \text{ML collision confidence} + (1 - \text{ML model confidence}) \times \text{heuristic collision confidence}.$$

17. The method of claim 13, wherein the ML model confidence is determined based on a probabilistic model or a distance-based model.

18. The method of claim 13, wherein the ML predicted trajectory and the heuristic predicted trajectory are generated based on vehicle kinematics, vehicle controls, and road conditions, wherein:

the vehicle kinematics comprise a vehicle position, a vehicle velocity, and a vehicle acceleration;

the vehicle controls comprise vehicle steering, vehicle throttle, and brake inputs;

the road conditions comprise road surface conditions, road geometry, and traffic conditions; and information of the vehicle kinematics, the vehicle controls, and the road conditions are collected by one or more vision sensors and speed sensors.

\* \* \* \* \*